United States Patent [19]

Kitagawa et al.

[11] Patent Number: 6,078,541
[45] Date of Patent: Jun. 20, 2000

[54] DEVICE CONTROLLER HAVING VOLATILE AND NON-VOLATILE MEMORY FOR STORAGE OF DECOMPRESSED AND COMPRESSED DATA

[75] Inventors: Masayuki Kitagawa; Koji Tsuboi, both of Irvine, Calif.

[73] Assignee: Mitsumi Electronics Co., Ltd., Japan

[21] Appl. No.: 09/067,706

[22] Filed: Apr. 28, 1998

[51] Int. Cl.[7] .................................................. G11C 8/00
[52] U.S. Cl. ........................ 365/230.01; 365/230.08
[58] Field of Search ..................... 365/230.08, 230.01, 365/185.01, 185.33, 185.08

[56] References Cited

U.S. PATENT DOCUMENTS

| | | | |
|---|---|---|---|
| 5,194,995 | 3/1993 | Severtson et al. | 360/48 |
| 5,218,487 | 6/1993 | Richmond | 360/27 |
| 5,287,478 | 2/1994 | Johnston et al. | 395/425 |
| 5,530,847 | 6/1996 | Schieve et al. | 395/183.14 |
| 5,555,229 | 9/1996 | Kojima et al. | 369/60 |
| 5,623,623 | 4/1997 | Kim et al. | 395/430 |
| 5,671,389 | 9/1997 | Saliba | 395/438 |
| 5,838,981 | 11/1998 | Gotoh | 395/712 |
| 5,850,562 | 12/1998 | Crump et al. | 395/800 |

OTHER PUBLICATIONS

Doi, M., et al. Development of a Rotary Head Digital Audio Tape Recorder (R–DAT), Sanyo Technical Review vol. 19 No. 2, pp. 3–17, Aug. 1997.

*Primary Examiner*—Richard Elms
*Assistant Examiner*—Anh Phung
*Attorney, Agent, or Firm*—Knobbe Martens Olson & Bear, LLP

[57] ABSTRACT

A device controller for controlling the operation of the drive device. The controller includes a microprocessor, a volatile memory, and a non-volatile memory. The non-volatile memory stores an uncompressed decompression program and a compressed device operating program. The microprocessor automatically decompresses the device operating program by executing the decompression program and stores the decompressed device operating program into the volatile memory when the drive is powered up or reset. The microprocessor then executes the device operating program stored in the volatile memory which has a faster data access rate than the non-volatile memory. As the device operating program is stored in a compressed form, the size of the non-volatile memory is minimized. The present invention may also reduce the size of a non-volatile memory for storing data used in a device controller.

37 Claims, 3 Drawing Sheets

DEVICE CONTROLLER HAVING VOLATILE AND NON-VOLATILE MEMORY FOR STORAGE OF DECOMPRESSED AND COMPRESSED DATA

BACKGROUND OF THE INVENTION

1. Field of the Invention

The present invention relates to a memory system having a non-volatile and a volatile memory. More particularly, the present invention relates to a memory system that stores a set of executable codes in a volatile memory and decompresses it into a non-volatile memory for execution.

2. Description of the Related Technology

A data storage device, such as a digital audio tape (DAT) drive, is composed of a drive device mechanism including read/write heads and a device controller for controlling the drive device according to instructions from a connected host computer such as a personal computer (PC). The device controller monitors and controls the operation of the entire drive device by running a device operating program. The device controller thus generally includes a microprocessor for running the program code, a non-volatile memory for persistently storing the program code, a volatile memory for temporarily storing program code and data, and bus lines to allow data communication among the components.

The non-volatile memory of the device controller stores the device operating program and, in addition, a loader program. A flash memory is an important type of non-volatile memory since data stored in a flash memory can be rewritten. Thus, by using a flash memory, revisions to the device operating program may be updated with the device controller.

The volatile memory of the device controller has a buffer to temporarily store data which is to be written to the storage device or to be transferred to the host computer. The volatile memory also has an area for storing the device operating program and data during the execution. In DAT drive controllers, the volatile memory is typically implemented by a dynamic random access memory (DRAM).

When power to a data storage device is turned on, the microprocessor automatically executes the loader program stored in the nonvolatile memory, and copies the device operating program from the nonvolatile memory to the volatile memory. Then the microprocessor runs the device operating program to monitor and control the operation of the drive.

Because of the increasing need for fine control of the drive software, as well as the need for providing greater functionality in operating the drive, device operating programs have continued to grow. Naturally, this increase in program size requires a larger non-volatile memory to store it. It may, however, not be practical to use a larger non-volatile memory because of the increased product cost. Therefore, there is a need to restrict the size of the expensive non-volatile memory which is used for storing programs in a data storage device.

SUMMARY OF THE INVENTION

The aforementioned needs are satisfied by several aspects of the present invention.

The present invention provides a device controller using a relatively small size of non-volatile memory for storing device operating programs.

The present invention also provides a memory system having a reduced size of a non-volatile memory for storing data inevitably used in the system.

One aspect of the present invention provides a device controller for controlling operation of a device. The controller comprises: a volatile memory; a non-volatile memory storing a compressed program; and a microprocessor in data communication with the volatile memory and the non-volatile memory for executing programs, wherein the microprocessor decompresses the compressed program and stores the decompressed program into the volatile memory for execution.

Another aspect of the present invention provides a method for executing a compressed program in a device controller for controlling a peripheral device connected to a host computer through the controller, the controller comprising a volatile memory, a non-volatile memory, and a microprocessor in data communication with the volatile memory and the non-volatile memory for executing programs, and the non-volatile memory storing an uncompressed decompressing program. The method comprises: checking automatically if the compressed program is available in the non-volatile memory when the controller is powered up or reset; executing the decompression program to decompress the compressed program when the compressed program is available and storing the decompressed program into the volatile memory; and executing the decompressed program.

A further aspect of the present invention provides a memory system comprising a volatile memory; a non-volatile memory storing compressed electronic information and an uncompressed decompression program for decompressing the compressed electronic information; and a microprocessor in data communication with the volatile memory and the non-volatile memory for executing programs, wherein the microprocessor decompresses the compressed electronic information and stores the decompressed electronic information into the volatile memory for use.

These and other features of the present invention will become more fully apparent from the following description and claims.

DETAILED DESCRIPTION OF THE DRAWINGS

The size of non-volatile memory required to store a device operating program is reduced by storing the device operating programs in a compressed form as will be described below for one embodiment of the present invention.

Figure 1:
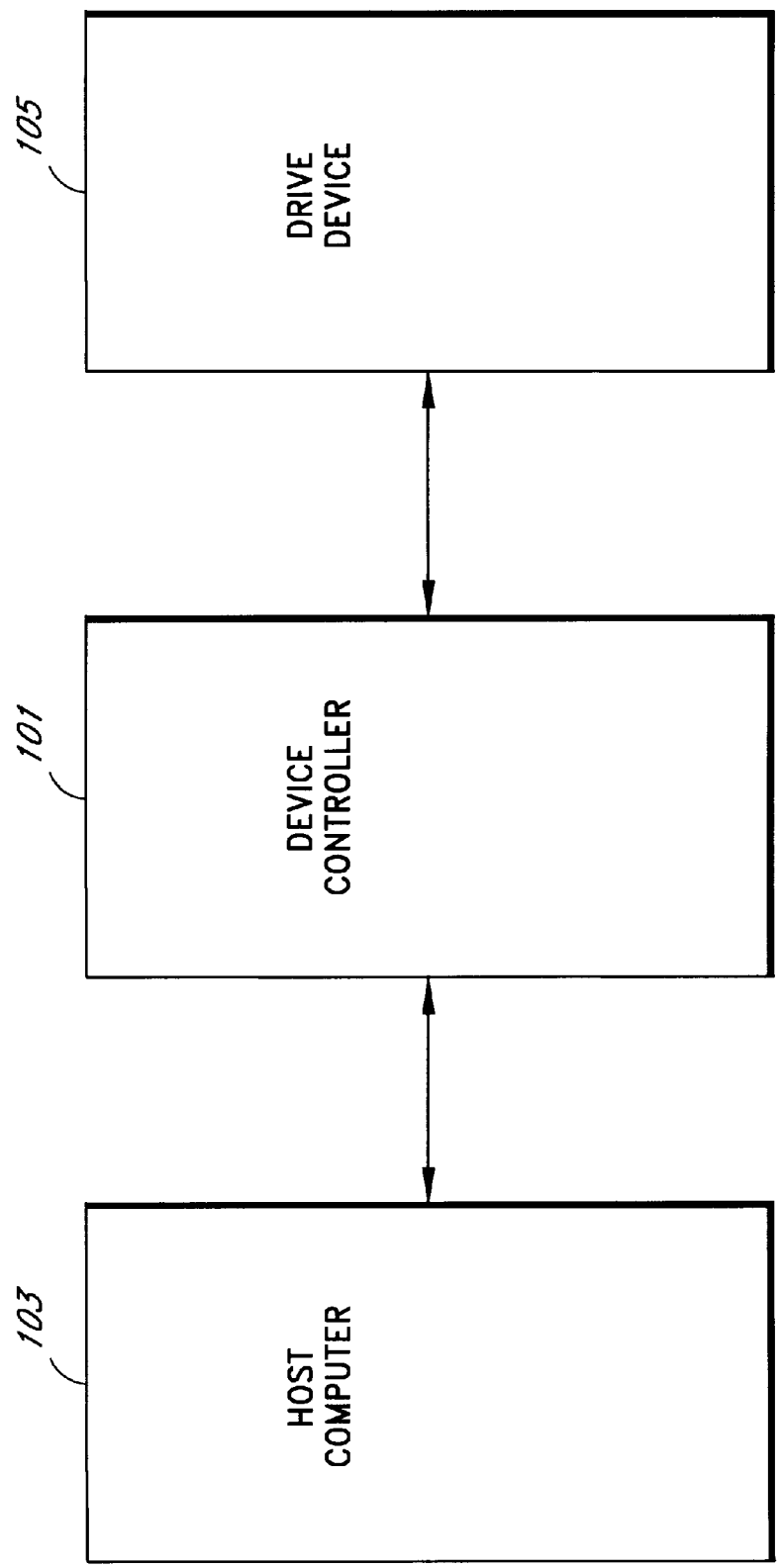
FIG. 1 is a schematic block diagram, illustrating the interrelation of a device controller of the present invention with a host computer and a drive device.

Referring to FIG. 1, a device controller 101 of the present invention permits a host computer 103 to communicate data to and from a drive device 105. The device controller 101 monitors and controls the entire operation of the drive device 105 by running a device operating program which is stored in a non-volatile memory of the device controller 101 in a compressed form. The device controller 101 receives instructions from the host computer 103 to operate the device drive 105. The device controller 101 also communicates the status of the drive device 105 with the host computer 103.

The device controller 101 may be a controller for any peripheral device of a host computer 103. The device controller 101 may, for instance, be a controller for a storage device of a host computer 103, such as a controller for a DAT drive. The host computer 103 may be any general purpose computer such as an IBM compatible or Apple Macintosh personal computer, a workstation available from Sun Microsystems, Inc., IBM, Hewlett Packard, or Silicon Graphics, Inc., a minicomputer available from Digital Equipment Corporation, or a mainframe available from IBM. The host computer 103 may also be a special purpose computer. The device controller 101 may be connected to the host computer 103 through one of the extended slots in the host computer 103. The device controller 101 also may be integrated into a single package with the drive device 105.

Figure 2:
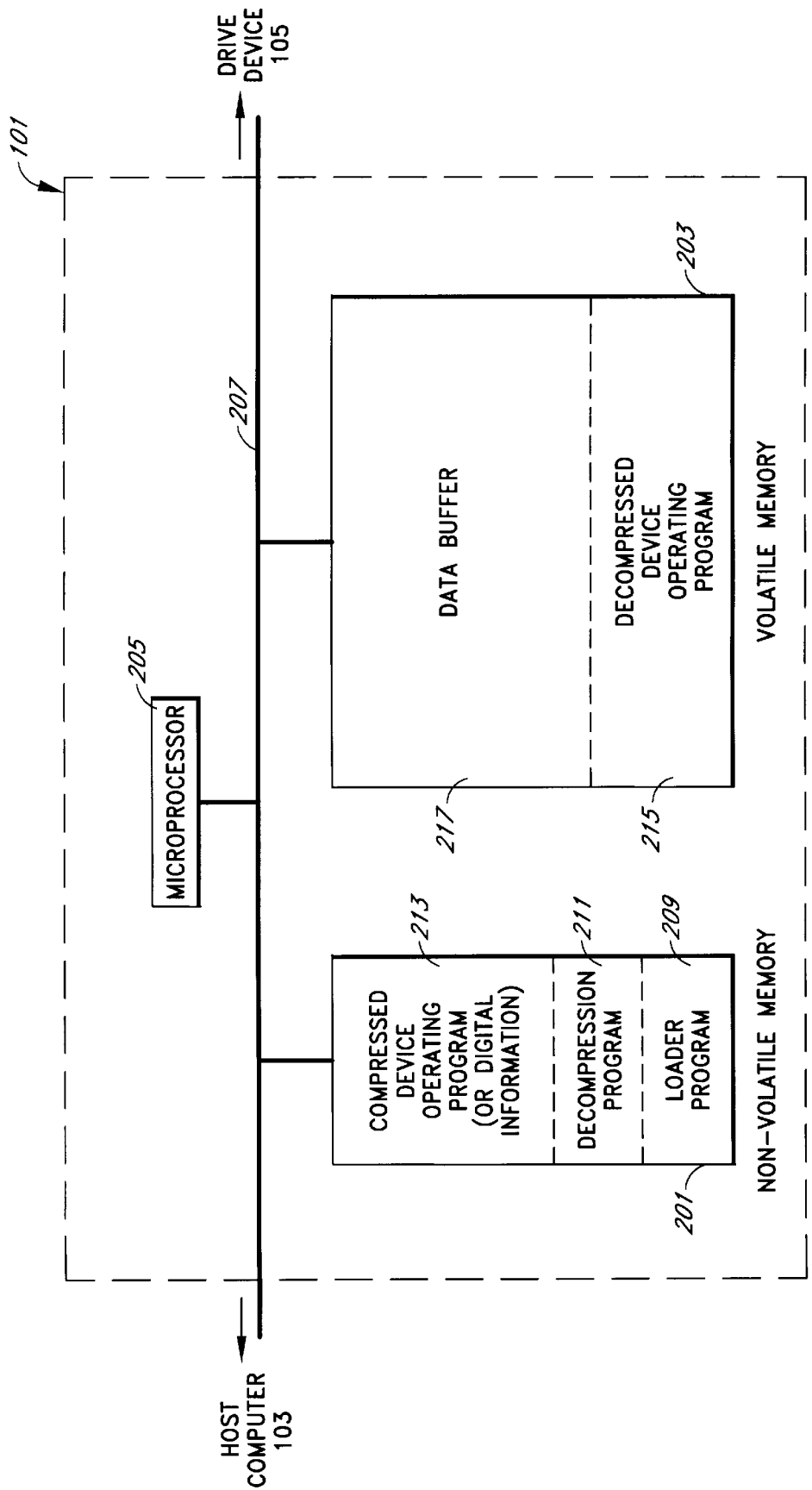
FIG. 2 is a partial block diagram of the DAT drive, illustrating the memory system of a device controller of one embodiment of the present invention.

FIG. 2 shows one embodiment of a DAT drive controller which comprises a non-volatile memory 201, a volatile memory 203, and a microprocessor 205. A bus line 207 interconnects the non-volatile memory 201, the volatile memory 203, and the microprocessor 205. The bus line 207 may also electrically connect the device controller 101 to the host computer 103 and the drive device 105 either directly or indirectly via the use of other integrated circuits.

The non-volatile memory 201 stores a loader program 209, a decompression program 211, and a device operating program 213. The non-volatile memory 201 may be writable, so that future revisions of programs may be stored in the device controller. The writable non-volatile memory may be a flash memory, electrically erasable programmable read only memory (EEPROM), any magnetically recordable media, or an internal writable ROM of a microprocessor. In one embodiment, the writable non-volatile memory is advantageously a flash memory. A flash memory such as Am29F200S available from Advanced Micro Devices Inc., and M29F200B available from SGS-Thomson Microelectronics could be utilized. The device operating program 213 is stored in a compressed form so that the size of the non-volatile memory 201 is minimized. The loader program 209 and the decompressing program 211, on the other hand, are stored in an uncompressed form so that the microprocessor 205 may run them as is, without decompression.

The volatile memory 203, which may be a DRAM, an SRAM or an internal RAM of a microprocessor, functions as a main memory for storing an executable copy of the device operating program 215, i.e., the copy created after decompression of the compressed device operating program 213. The volatile memory 203 thus stores the decompressed device operating program 215 and data generated during its execution. The volatile memory 203 has a buffer 217 for buffering data transfer between the drive device 105 and the host computer 103. Examples of the volatile memory 203 are HM5118116OBJ available from Hitachi Co., Ltd., TC5118165CJ available from Toshiba Corporation, and uPD421816OLE available from NEC Co., Ltd. The volatile memory 203 will typically have a higher data access rate than the non-volatile memory 201 since the program is fetched and executed from the volatile memory 203 rather than the non-volatile memory 201. For example, the access cycle time of Am29F200S, non-volatile memory, and HM5118116OBJ, volatile memory, are respectively 120 ns and 60 ns.

The microprocessor 205 is required to run the loader program 209 and the decompression program 211 stored in the non-volatile memory 201 and the decompressed device operating program 215 which is stored in the volatile memory 203 after running the decompression program 211. The microprocessor 205 may be any conventional general purpose or single-chip or multi-chip processor such as HD6417604SF28 available from Hitachi Co., Ltd., uPD703001GC-25-7EA available from NEC Co., Ltd., and MC68331 and MC68332 from Motorola Inc.

The compressed device operating program 213 is compressed in a format which the decompression program 211 can decompress. Any conventional compression/decompression algorithms, such as Lempel-Ziv, Lempel-Ziv-Huffman, and Lempel-Ziv-Welch, could be utilized. In one embodiment, a Lempel-Ziv algorithm is advantageously used in the compression/decompression. As the decompression program 211, GZIP available from GZIP Organization (http://www.gzip.org) run by Free Software Foundation Inc. and PKZIP available from Pkware Inc. are examples.

The compressed device operating program 213 may be a self-executing file which can be decompressed and executed without the decompression program 211. If the device operating program 213 is compressed in a self-executable format, the decompression program 211 is not required and the size of the non-volatile memory 201 can be reduced. Any conventional self-executable format can be utilized.

When the device controller 101 is powered up or reset, the instructions of the loader program 209 are fetched and executed by the microprocessor 205. At some point, control is passed from the loader program 209 to the decompression program 211. Then, the compressed device operating program 213 is decompressed by the execution of the decompression program 211 under the control of the loader program 209. As the decompression proceeds, the decompressed device operating program 215 is stored a fragment at a time into the volatile memory 203. At some point, control passes to the decompressed device operating program stored in the volatile memory. The decompressed device operating program 215 is fetched and run by the microprocessor 205 to monitor and control the operation of the drive device 105. For example, the device operating program 215 controls the data read/write, data transfer between the host computer 103 and the drive device 105, data search, drum rotation, tape movement by rotating the capstan, or tape positioning in accordance with instructions from the host computer 103. The operation of one embodiment of the present invention will be discussed below in reference to FIG. 3.

Figure 3:
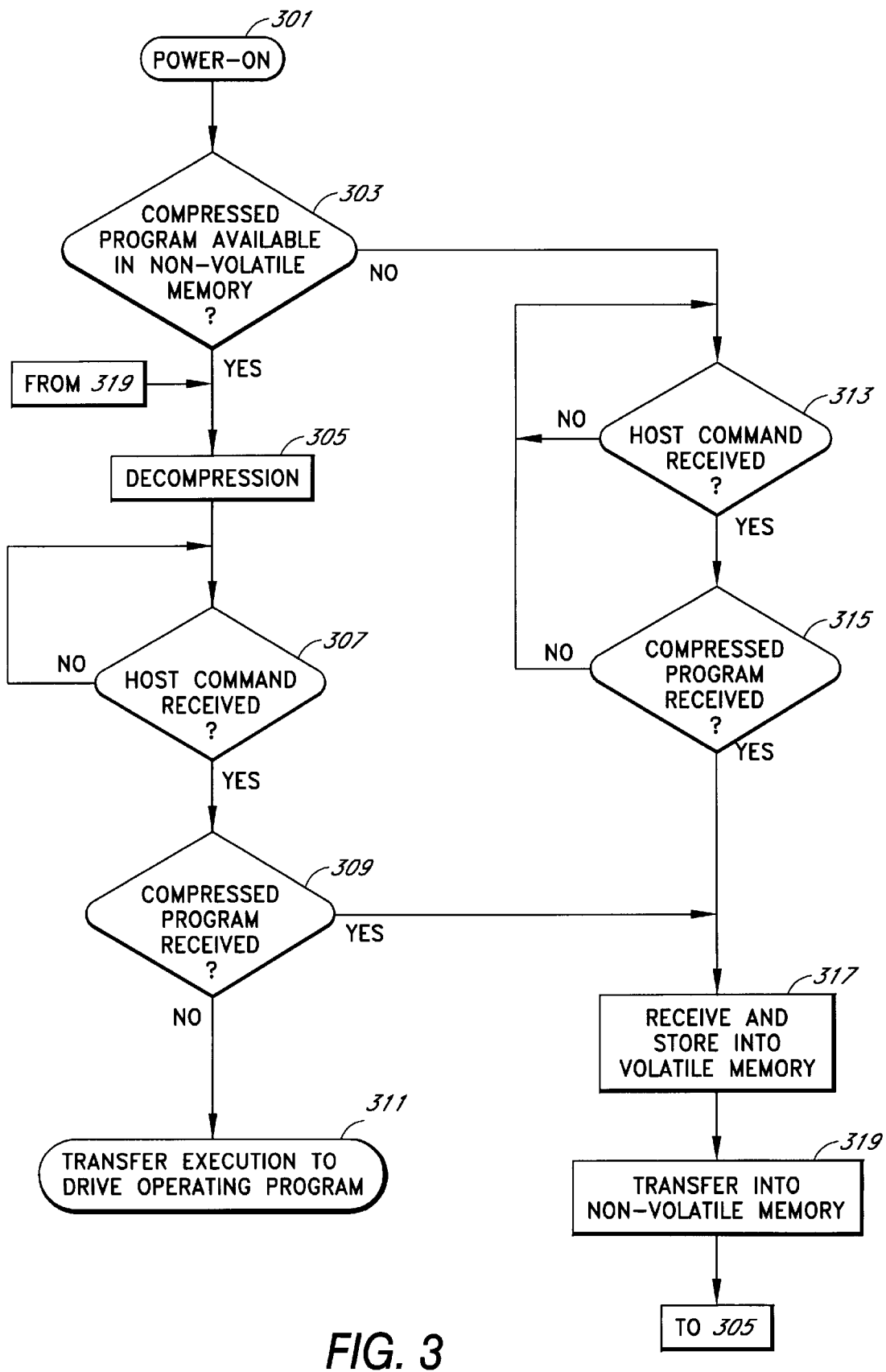
FIG. 3 is a flowchart, illustrating the loading, storing, and updating of a device operating program of one embodiment of the present invention.

FIG. 3 shows an operational flowchart for the control of receiving, updating, and decompressing the compressed device operating program 213 by the loader program 209 in one embodiment of the present invention.

When the drive device 105 is powered on, the microprocessor 205 automatically fetches the loader program 209 from the non-volatile memory 201 and starts to run the loader program 209 at a state 301. The loader program 209, at a state 303, checks whether the compressed device operating program 213 is available in the non-volatile memory 201 or not. If the compressed device operating program 213 is stored in the non-volatile memory 201, the loader program 209 fetches the decompression program 211 from the non-volatile memory 201 and executes it to decompress the compressed device operating program 213 at a state 305. As the decompression program 211 decompresses the compressed device operating program 213, the microprocessor 205 stores the decompressed program into an area of the volatile memory 203 reserved for the decompressed device operating program 215. When the decompression is completed, the microprocessor 205 is ready to execute the decompressed device operating program 215 to operate the drive device 105 according to instructions from the host computer 103.

At a state 307, the loader program waits for an instruction from the host computer 103 for a specific command function such as read or write data from or onto a magnetic tape loaded in the drive device 105, position a specified location on the tape, search a specific data, or read a specified size of data. When a command is received from the host computer 103, the loader program 209 checks if the host command is to download a compressed device operating program at a state 309. If the host command is not to download a compressed program, the loader program 209 transfers the execution to the device operating program at a state 311. The device operating program 215 then decodes the instruction from the host computer 311 and starts to control the operation of the drive device 105.

If the compressed device operating program 213 is not found in the non-volatile memory 201 at the state 303, the loader program 209 waits for a compressed device operating program 213 from the host computer 103 at a state 313. When a command comes from the host computer 103, it is determined whether or not a compressed program is received at a state 315. If the received instruction is the compressed device operating program, the loader program 209 proceeds to the state 317. Otherwise, the loader program 209 goes back to the state 313 to wait on a command from the host computer 103.

When the received command is determined to be a compressed device operating program 213 at either of the states 309 or 315, the compressed program 213 is received and stored into the non-volatile memory 201. In one embodiment, the compressed program 213 is received and temporarily stored in the data buffer 217 of the volatile memory 203 first at a state 317, and it is transferred, at a state 319, to the non-volatile memory 201 after the entire program has been received. This is because receiving the program by using the faster volatile memory 203 reduces the time that the host computer 205 is busy with the transfer process.

When the transfer of the compressed device operating program 213 is completed at the state 319, the loader program 209 goes to the state 305 to decompress the newly received program 213. The compressed device operating program 213 is decompressed, and the loader program 209 continues the flow from there as described above.

A comparison can be made of memory sizes, space occupancies, and costs of non-volatile memory required in a DAT drive controller of one embodiment of the present invention and the prior art. Assume that the device operating program 213 is initially 611 kB. The device operating program 213 is compressed by using GZIP.COM which utilizes Lempel-Ziv algorithm, which reduces the size of the program to 221 kb. Provided that the sizes of the decompression program 211 and the loader program 209 are 2 kb and 12 kb, respectively. 235 kb (221+2+12) of the total size of the programs requires one 256 kb flash memory as the non-volatile memory 201 which occupies 1×(0.6×1.1) square inches on a printed circuit board of a DAT drive and costs about U.S. $10 in today's prices. On the other hand, the 611 kb of non-compressed device operating program and a 12 kb of loader require three 256 kb flash memories which occupy 3×(0.6×1.1) square inches on a printed circuit board of a DAT drive and costs about U.S. $30.

One embodiment of the present invention stores the device operating program in the non-volatile memory in a compressed form. This reduces the memory size of the non-volatile memory required to persistently store the drive operating program as well as reducing the space occupancy of the non-volatile memory in a printed circuit board. Additionally, since the device operating program is stored in a compressed form, it takes less time to download the program from the host computer in this embodiment of the present invention than a device controller storing the program in an uncompressed form.

Another embodiment of the present invention is directed to a memory system for storing electronic information in a compressed form and for decompressing the electronic information for use. FIG. 2 also shows another embodiment of the present invention as a memory system which comprises a non-volatile memory 201, a volatile memory 203, a microprocessor 205, and a bus line 207. In this embodiment, the bus line 207 is not necessarily connected to the host computer 103 or drive device 105.

The non-volatile memory 201 stores a loader program 209, a decompression program 211, and digital information 213. The term "digital information" may include any data or program code which can be stored in a digital form. The loader program 209 and the decompression program 211 are stored in an uncompressed form, so that the microprocessor 205 can retrieve them without decompression. The digital information 213 is stored in a compressed form to minimize the memory size of the non-volatile memory 201. The microprocessor automatically executes the loader program 209 to control the operation of the memory system when the power is turned on. The loader program 209 runs the decompression program 211 to decompress the compressed digital information 213 and store the decompressed digital information 213 into the volatile memory 203. The digital information 213 may include programs to be executed by the microprocessor 205 and data to be used during the execution of the programs.

The non-volatile memory 201 may further store a compression program (not shown) in an uncompressed form. The microprocessor 205 executes the compression program when the programs or data stored in the volatile memory 203 are updated and need to be persistently stored into the non-volatile memory 201. Thus, in such an embodiment, the non-volatile memory 201 is writable. However, the non-volatile memory 201 need not be a writable memory when there is no need to recompress digital information and save it.

The non-volatile memory 201 may be a magnetic storage device such as a magnetic disk and a magnetic tape, a solid state storage device such as a flash memory, a ROM, a PROM, an EEPROM, an FRAM, an internal writable ROM of a microprocessor, and an optical storage device such as a CD-ROM, a CD-ROM-Recordable (CD-R), and a CD-Recordable and Writable (CD-RW). The volatile memory 203 functions as a main memory as discussed above. Examples of the volatile memory 203 are a DRAM, an SRAM, and an internal RAM of a microprocessor. It is preferable that the volatile memory 203 has a faster data access rate than the non-volatile memory 201 since the program is retrieved from the volatile memory 203 rather than the non-volatile memory 201. As to the microprocessor 205, any conventional general purpose, single-chip or multi-chip processor, may be utilized as mentioned above.

This embodiment of the present invention provides a memory system storing data and/or programs in the non-volatile 201 in a compressed form and using the data and/or programs after the microprocessor 205 decompresses them by executing the decompression program 211. The memory system may store a compression program in the non-volatile memory 201. The microprocessor 205 executes the compression program when data and/or program of the nonvolatile memory 201 has been modified and needs to be persistently stored.

Although the above described embodiments use the decompression and/or compression algorithm in a form of a program, such algorithms may be implemented in an integrated circuit. Advantageously, the integrated circuit for decompressing compressed digital information and/or compressing uncompressed digital information is the microprocessor 205.

Although the present invention has been described in terms of embodiments, other embodiments will become apparent to those of ordinary skill in the art, in view of the disclosure herein. Accordingly, the present invention is not intended to be limited by the recitation of the embodiments, but is instead intended to be defined solely by reference to the appended claims.

What is claimed is:

1. A device controller for controlling operation of a peripheral device connected to a host computer, the controller comprising:

a volatile memory;

a non-volatile memory storing a compressed program; and a microprocessor in data communication with the volatile memory and the non-volatile memory for executing programs, wherein the microprocessor decompresses the compressed program and stores the decompressed program into the volatile memory for execution and wherein the device controller connects the peripheral device to the host computer, and the compressed program comprises a device operating program for controlling operation of the peripheral device.

2. The controller as defined in claim 1, wherein the volatile memory has a faster data access rate than the non-volatile memory.

3. The controller as defined in claim 1, wherein the volatile memory comprises a DRAM.

4. The controller as defined in claim 1, wherein the non-volatile memory comprises a writable non-volatile memory.

5. The controller as defined in claim 4, wherein the writable non-volatile memory comprises a flash memory.

6. The controller as defined in claim 4, wherein the compressed program stored in the non-volatile memory can be updated by overwriting the compressed program with a new compressed program received from the host computer connected to the controller.

7. The controller as defined in claim 6, wherein the new program is compressed at the host computer, the new compressed program is temporarily stored in the volatile memory until being written to the non-volatile memory.

8. The controller as defined in claim 6, wherein the non-volatile memory further stores a compression program for compressing digital information in an uncompressed form so that the microprocessor can execute the compression program without decompression, and wherein the microprocessor executes the compression program to compress the new program and stores the new compressed program into the non-volatile memory.

9. The controller as defined in claim 6, further comprising an integrated circuit for compressing digital information, wherein the integrated circuit compresses the new program and stores the new compressed program into the non-volatile memory.

10. The controller as defined in claim 9, wherein the integrated circuit comprises the microprocessor.

11. The controller as defined in claim 1, wherein the non-volatile memory further stores a decompression program for decompressing compressed digital information in an uncompressed form so that the microprocessor can execute the decompression program without decompression, and the microprocessor executes the decompression program to decompress the compressed device operating program and to store the decompressed program into the volatile memory when the controller is powered up or reset.

12. The controller as defined in claim 11, wherein the microprocessor executes the device operating program when the decompression is completed.

13. The controller as defined in claim 1, wherein the microprocessor executes the device operating program when the controller receives a command for operation of the peripheral device from the host computer.

14. The controller as defined in claim 1, wherein the peripheral device is a data storage drive.

15. The controller as defined in claim 14, wherein the data storage device is DAT drive.

16. The controller as defined in claim 10, wherein the non-volatile memory comprises a writable non-volatile memory, and wherein the decompression program in the non-volatile memory can be updated by overwriting the decompression program with a new decompression program received from a host computer connected to the controller.

17. The controller as defined in claim 1, wherein the non-volatile memory comprises an internal RAM of the microprocessor.

18. The controller as defined in claim 1, wherein the volatile memory comprises an internal ROM of the microprocessor.

19. The controller as defined in claim 1, further comprising an integrated circuit for decompressing compressed digital information, wherein the integrated circuit decompresses the compressed device operating program and stores the decompressed program into the volatile memory when the controller is powered up or reset.

20. A method for executing a compressed program in a device controller for controlling a peripheral device connected to a host computer through the controller, the method comprising:

checking automatically if a compressed device operating program is available in a non-volatile memory of the device controller when the controller is powered up or reset;

executing an uncompressed decompression program stored in the non-volatile memory to decompress the compressed device operating program when the compressed device operating program is available and storing a decompressed device operating program into a volatile memory of the device controller; and executing the decompressed device operating program to control the peripheral device.

21. The method as defined in claim 20, wherein the peripheral device is a data storage drive.

22. The method as defined in claim 21, wherein the data storage drive is a DAT drive.

23. The method as defined in claim 21, wherein the compressed program is a device operating program for controlling operation of the peripheral device.

24. The method as defined in claim 21, wherein the non-volatile memory is a writable non-volatile memory.

25. The method as defined in claim 24, wherein if the compressed program is not available in the non-volatile memory the controller receives a compressed program from the host computer before executing the decompression program.

26. The method as defined in claim 25, wherein the microprocessor temporarily stores the compressed program in the volatile memory while the controller receives the compressed program, and the microprocessor transfers the compressed program into the non-volatile memory when the controller completes receiving the compressed program.

27. A memory system for a peripheral device of a host computer, the memory system comprising:

a volatile memory;

a non-volatile memory comprising a first section storing compressed digital information and a second section storing an uncompressed decompression program for decompressing the compressed digital information; and a microprocessor in data communication with the volatile memory and the non-volatile memory for executing programs, wherein the microprocessor is configured to decompress the compressed digital information to store the resulting decompressed digital information into the volatile memory and to use the decompressed digital information to operate the peripheral device.

28. The memory system as defined in claim 27, wherein the volatile memory has a faster data access rate than the non-volatile memory.

29. The memory system as defined in claim 27, wherein the decompressed digital information comprises an executable code, and the microprocessor runs the executable code.

30. The memory system as defined in claim 29, wherein the decompressed digital information further comprises data to be used with the executable code.

31. The memory system as defined in claim 27, wherein the second section of the non-volatile memory further stores an uncompressed compression program for compressing digital information, and the non-volatile memory is a writable non-volatile memory.

32. The memory system as defined in claim 31, wherein the microprocessor compresses the digital information stored in the volatile memory by executing the compression program, and the microprocessor stores the compressed digital information into the first section of the non-volatile memory.

33. The memory system as defined in claim 27, wherein the non-volatile memory comprises an internal RAM of the microprocessor.

34. The memory system as defined in claim 27, wherein the volatile memory comprises an internal ROM of the microprocessor.

35. A memory system of an electronic device connected to a computer, the memory system comprising:

a volatile memory;

a non-volatile memory;

a microprocessor in data communication with the volatile memory and the non-volatile memory for executing programs; and an integrated circuit configured to process digital information, wherein the digital information processing comprises decompression of compressed digital information or compression of uncompressed digital information;

wherein the non-volatile memory comprises a section to store essential digital information to operate the device in a compressed format, the essential digital information when available is decompressed by the integrated circuit, and the resulting decompressed essential digital information is used by the microprocessor to operate the electronic device.

36. The memory system as defined in the claim 35, wherein the integrated circuit comprises a separate microprocessor.

37. The memory system as defined in claim 36, wherein the integrated circuit is implemented in the microprocessor.

* * * * *